United States Patent [19]

Takashi et al.

[11] Patent Number: 5,046,002
[45] Date of Patent: Sep. 3, 1991

[54] DISTRIBUTED DATA BASE ACCESS REQUEST PROCESSING SYSTEM

[75] Inventors: Rinichi Takashi, Yokohama; Hiromichi Ishikawa, Fujisawa, both of Japan

[73] Assignee: Hitachi, Ltd., Tokyo, Japan

[21] Appl. No.: 515,364

[22] Filed: Apr. 26, 1990

Related U.S. Application Data

[63] Continuation of Ser. No. 126,348, Nov. 30, 1987, abandoned.

[30] Foreign Application Priority Data

Dec. 1, 1986 [JP] Japan .................... 61-286162

[51] Int. Cl.⁵ .................... G06F 15/16; G06F 15/40
[52] U.S. Cl. .................... 364/200; 364/282.1; 364/282.4; 364/408
[58] Field of Search ... 364/200 MS File, 900 MS File, 364/187, 401, 408; 902/40

[56] References Cited

U.S. PATENT DOCUMENTS 4,432,057  2/1984  Daniell et al. ............ 364/200
4,714,992 12/1987  Gladney et al. .......... 364/200
4,714,995 12/1987  Materna et al. .......... 364/200
4,745,559  5/1988  Willis et al. ............. 364/514
4,769,772  9/1988  Dwyer .................... 364/200
4,799,156  1/1989  Sharrit et al. ........... 364/408
4,800,488  1/1989  Agrawal et al. .......... 364/200
4,845,624  7/1989  Clayton et al. .......... 364/200

Primary Examiner—Allen R. MacDonald
Assistant Examiner—Gopal C. Ray
Attorney, Agent, or Firm—Fay, Sharpe, Beall, Fagan, Minnich & McKee

[57] ABSTRACT

A distributed data base access request processing system in a distributed data base system including a computer system having a data base and a plurality of computer system effecting an update or a reference to the data base. A client side requesting a data base access issues a request for a synchronous processing to a server side if the data base access is related to a reference operation; whereas an asynchronous processing is requested if the data base access is associated with an update operation. On receiving such a request of a synchronous processing, the server side returns a response to the client side after the requested data base processing is completed. If an asynchronous processing is requested, the response is returned to the client side without waiting for the completion of the requested data base processing.

8 Claims, 3 Drawing Sheets

DISTRIBUTED DATA BASE ACCESS REQUEST PROCESSING SYSTEM

This is a continuation of copending application Ser. No. 07/126,348, filed on Nov. 30, 1987, now abandoned.

BACKGROUND OF THE INVENTION

The present invention relates to a data base access request processing system in a distributed data base system, and in particular, to an access request processing system suitable to perform processing between a system on a client side and a system on a server side in a concurrent fashion and to minimize the number of communications to be performed for the processing in the distributed data base system.

In a conventional access request processing system for controlling an access to a distributed data base, as disclosed in the JP-A-56-94433, in order to reduce the communication overhead, an update request and update data are retained in a stack queue of the system on the client side such that when a reference request is issued, the update request and the update data are sent to the system on the server side. Consequently, considerations have not been given to a possibility of concurrent processing in the systems on the client side and the server side.

In the prior art described above, when the system on the client side requesting a data base access sends a data base access request to the system on the server side effecting the data base service, the system on the server side returns a response to the system on the client side only after the entire data base processing associated with the request is completed.

In this method, however, in the period of time when the system on the server side is achieving the data base processing, the system on the client side is in a state waiting for a response from the system on the server side. This causes a significant problem in that the execution time is increased in the system on the client side.

The present invention address the situation above in order to solve the problems of the distributed data base access processing system of the prior art. Incidentally, among the data base access requests of the system on the client side, those related to a reference operation are processed such that an entity of data is transferred from a data base located in the system on the server side. Consequently, the data base reference processing of the system on the server side cannot be continued on the client side until the data entity transfer is completed because of the absence of the entity of the data in the system on the client side. For requests concerning an update operation, however, even after the entity of the updated data of the system on the client side is transferred to the system on the server side, the data entity exists in a buffer of the system on the client side. Hence, the processing on the client system can be effected without necessitating a wait state to wait for a transfer completion report from the system on the server side in an asynchronous fashion with respect to the processing in the system on the server side. Paying attention to this fact, in accordance with the present invention there is provided a distributed data base access request processing system which enables a concurrent processing to be achieved in the systems on the client and server sides and which is capable of minimizing the executing time in the system on the client side.

SUMMARY OF THE INVENTION

It is therefore an object of the present invention to provide a distributed data base access request processing system in a distributed data base system including a computer system having a data base and a plurality of computer systems performing an update or a reference to the data base. In this scheme, a client system requesting a data base access issues to a system on a server side a request of a synchronous processing or an asynchronous processing depending on whether the data base access is associated with a reference operation or an update operation, respectively. Upon receiving a request of synchronous processing, the server system sends a response to the system on the client side after the requested data base processing is completely finished. For the request of the asynchronous processing, the system on the server system immediately returns a response to the system on the client side without waiting for the completion of the requested data base processing on the server system.

In accordance with one feature of the present invention, when a data base access request appears, the system on the client side analyzes the data base access request to discriminate the request into a reference type or an update type. For an access request of the reference operation, the system on the client side operates to issue a synchronous processing request to the system on the server side; whereas for an access request of the update operation, the system on the client side operates to issue an asynchronous processing request to the system on the server side.

Furthermore, when receiving a data base access request of the synchronous processing from the system on the client side, the system on the server side returns a response to the data base processing to the system on the client side at the completion of the data base processing. On the other hand, when a data base access request of the asynchronous processing is received from the system on the client side, the system on the server side returns a response to the data base processing to the system on the client side prior to the completion of the data base processing.

As a result, even when an update processing of the data base requested from the system on the client side is taking place in the system on the server side, the subsequent processing can be continuously executed in the system on the client side. In this regard, the system on the client side is enabled to continue the data base access processing associated with an update operation in concurrence with the processing in the system on the server side. Therefore, execution time in the system on the client side is reduced.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Referring now to the accompanying drawings, an embodiment of the present invention will be described in detail.

Figure 1:
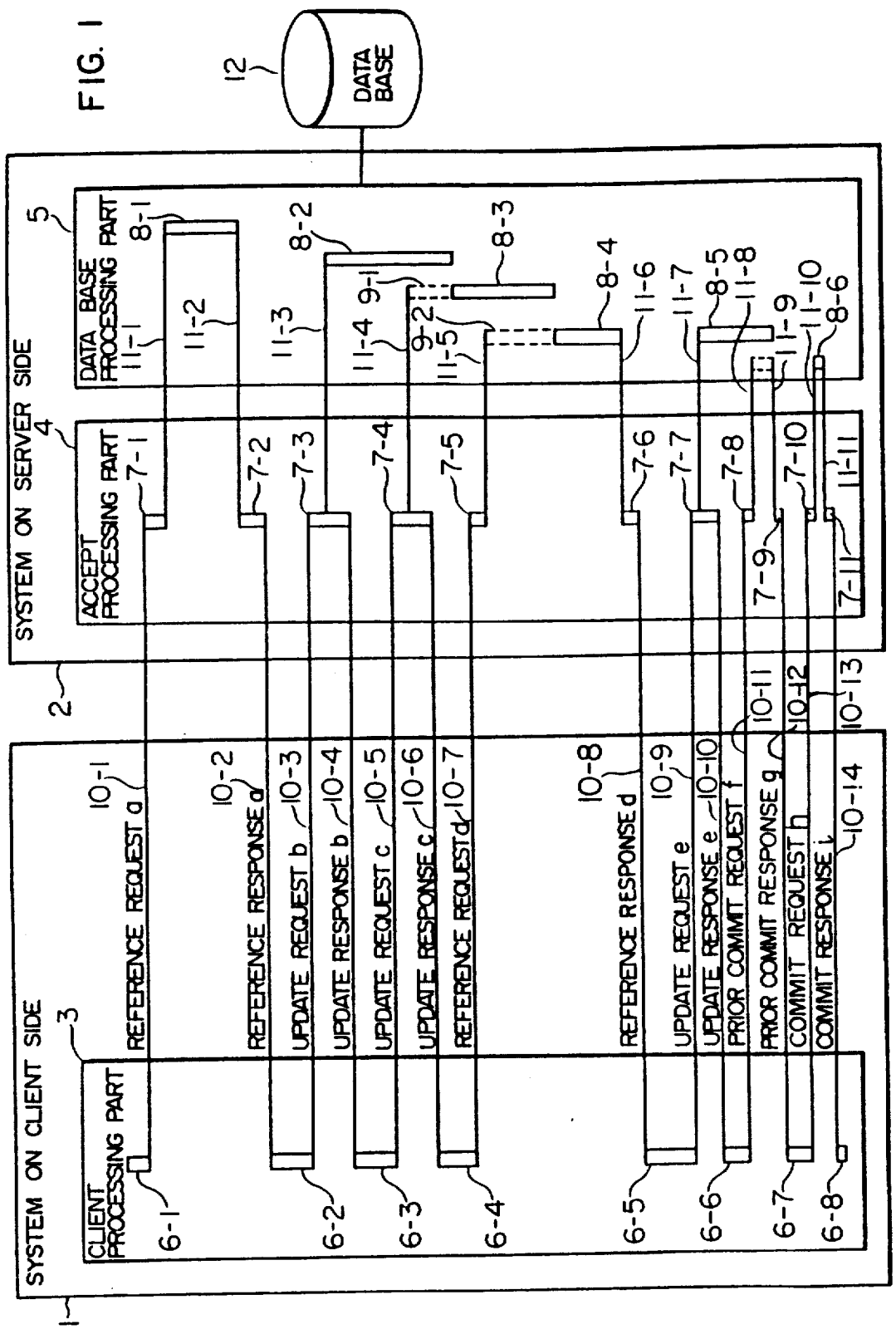
FIG. 1 is a schematic diagram useful to explain a processing flow between a system on a client side and a system on a server side in an embodiment according to the present invention.

FIG. 1 is a schematic diagram showing operations with respect to the elapsed time in a system on a client side requesting a data base service and a system on a server side effecting the data base service. Each constitute a distributed data base access request processing system according to the present invention. The configuration of FIG. 1 includes a system on a client side 1, a system on a server side 2,, a client processing part 3 for executing a data base access request processing for the server, an accept processing part 4 for achieving a data base access request in the system on the server side 2, and a data base processing part 5 in the system on the server side 2.

In the operations of processings there are included processing execute parts 6-1 to 6-5 in the client processing part 3, processing execute parts 7-1 to 7-6 in the data base access request accept processing part 5 in the system on the server side 2, execute parts 8-1 to 8-4 in the data base processing part 5 in the system on the server side 2, processing wait parts 9-1 to 9-2 of the data base processing part 5 in the system on the server side 2, requests and responses 10-1 to 10-14 communicated between the system on the client side 1 and the system on the server side 2, requests and responses 11-1 to 11 11 communicated between the accept processing part 4 and the data base processing part 5 in the system on the server side 2, and a data base 12 as an object to be accessed.

The operations of the data base access request processing system according to the embodiment will now be briefly described with reference to FIGS. 2-4.

Figure 2:
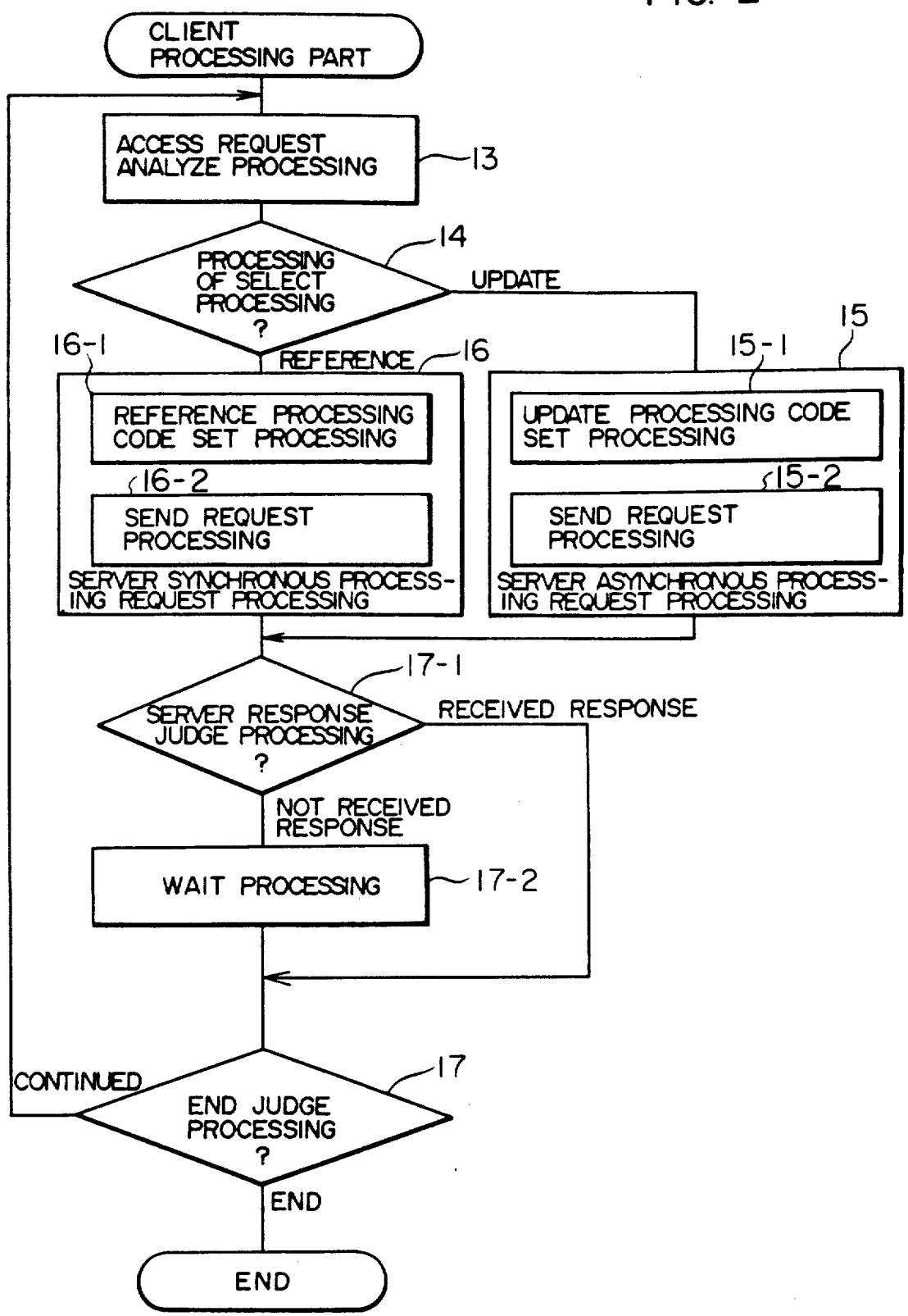
FIG. 2 is a flowchart of an operation in a client processing part.

When a data base access request occurs in the system on the client side and the client processing part 3 is initiated, an access request analyze processing 13 is effected for an analysis of the request specification, as shown in FIG. 2. It is then checked by a processing select processing 14 to determine whether the data base access request is related to a reference operation or an update operation. For an access request of a reference operation, a reference processing code set processing 16-1 of a server synchronous processing request processing 16 is effected to issue a request of a data base access of the synchronous processing to the system on the server side; whereas, for an access request of an update operation, an update processing code set processing 15-1 of a server asynchronous processing request processing 15 is performed to issue a request of a data base access of the asynchronous processing to the system on the server side. The completion of execution of each data base processing request to the system on the server side 2 is determined by a response report judge processing 17-1. The processing of the client processing part 3 is stopped by a wait processing 17-2 until a response is received from the system on the server system 2.

If data base access requests successively occur, the similar processing is repetitiously carried out until the completion report is detected by an end judge processing 17.

Figure 3:
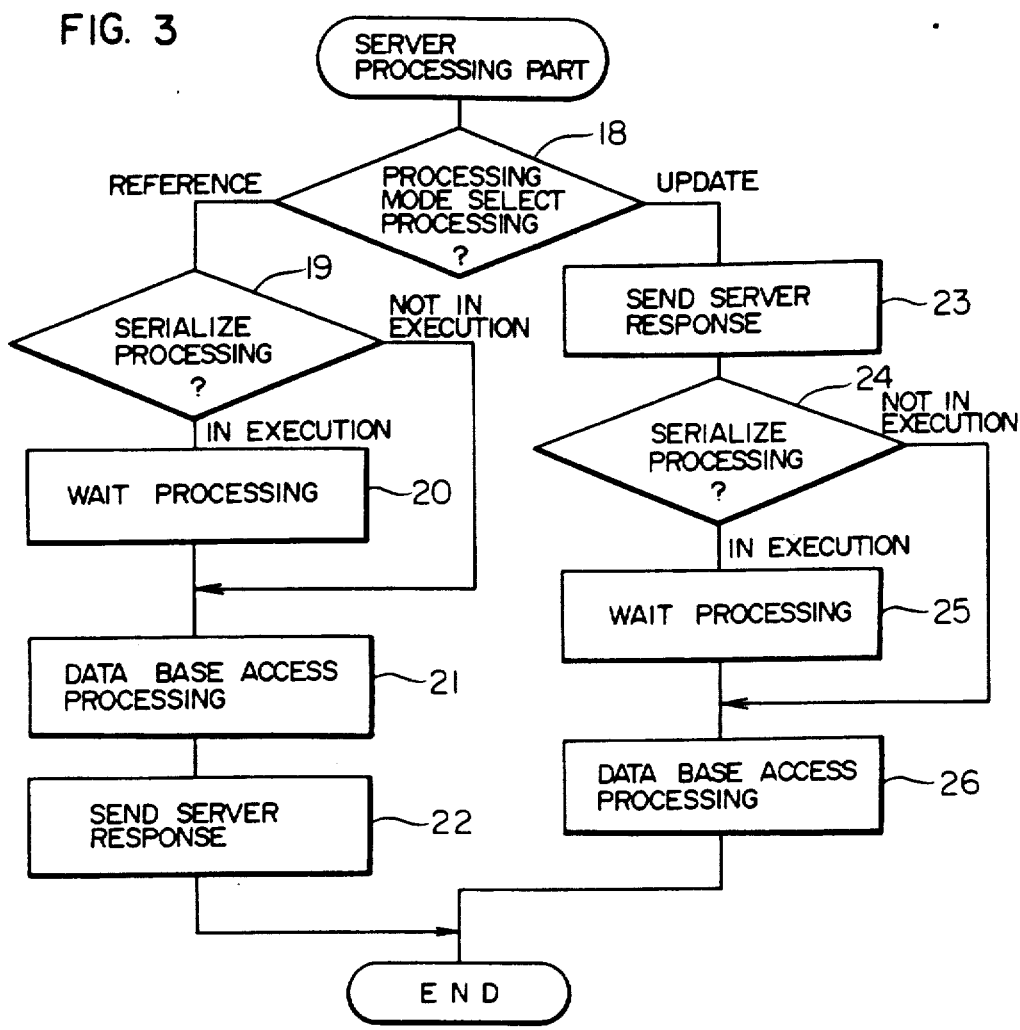
FIG. 3 is a flowchart of operations in an accept processing part and a data base processing part in the system on the server side.
Figure 4:
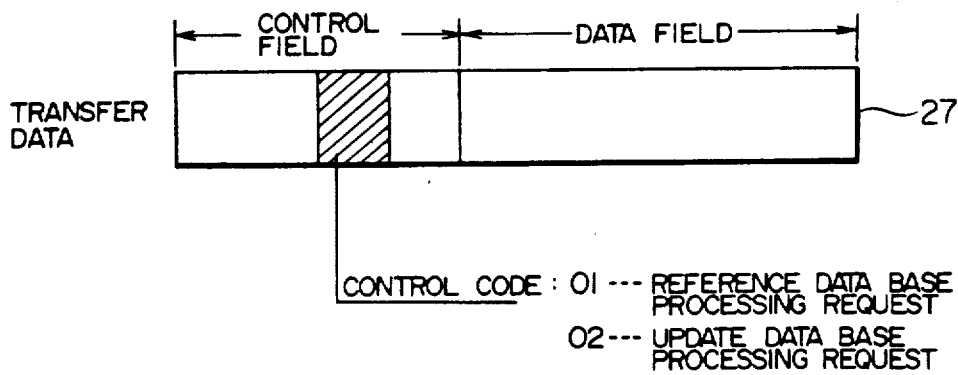
FIG. 4 is a schematic diagram showing a format of data transferred from the system on the client side to the system on the server side.

Notice the accept processing part 4 of the system on the server side 2, as shown in FIG. 3. In a processing mode select processing 18, a control code in a control field of transfer data 27 (FIG. 4), transferred from the system on the client side 1, is checked so as to determine whether the data base access is accomplished through a synchronous processing or an asynchronous processing. For a reference request, namely, when the control code of the control field in the transfer data 27 of FIG. 4 is a reference data base processing request 01, a serialize processing 19 is effected to achieve a synchronous processing so as to determine whether the update processing of the data base 12 is being executed in response to a request from the system on the client side 1. If the update processing has already been finished, the data base access processing 21 is executed. In the client processing part 3, as described above, since the processing request processing 15 or 16 enables the system to recognize the completion of the processing in the system on the server side 2 by receiving a response report from the system on the server side 2, a response report processing 22 is executed after the access processing 21 is completed. In the serialize processing 19, if a request from the system on the client side 1 is received and the update processing of the data base 12 is being executed, the wait processing 12 is initiated to wait for the completion of the update processing.

In addition, for an update request, namely, when the control code of the control field in the transfer data 27 (FIG. 4) is an update data base processing request 02, in order to accomplish an asynchronous processing, the response report processing 23 is first executed to return an update response to the client processing part 3. As a result, although the data base access processing has not been completed in the system on the server side 2, the client processing part 3 assumes that the access processing has already been finished and can continue the processing in the system on the client side by use of information for the data base access saved at the asynchronous processing request. Meanwhile the data base access is being executed in the system on the server side 2. In this regard, the processing of the data base processing part 5 and that of the client processing part 3 can be parallelly or concurrently accomplished. Thereafter, the serialize processing 24 checks to determine whether or not the proceeding update processing is taking place on the data base 12. If the update processing has already been finished, the data base access processing 26 is executed. In the serialize processing 24, if the update processing is being executed on the data base, the wait processing 25 is effected to wait for the completion of the update processing.

Referring next to an example associated with FIG. 1, a concrete operation example will be described.

When the client processing part 3 is initiated in the system on the client side 1 to issue a request of the processing of the reference request (a) 10-1 to the system on the server side 2, the access request analyze processing 13 analyzes the request specification as described above. Then, the processing select processing 14 is achieved to determine whether the data base access request is related to a reference operation or an update operation. For a reference request here, the reference processing code set processing 16-1 of the server synchronous processing request processing 16 sets "01" indicating a reference data base processing request to the control code of the control field in the transfer data 27 (FIG. 4). Then, a request transfer processing 16-2 issues the data base access request of the synchronous processing to the system on the server side so as to be received by the accept processing part 7-1 on the client side.

In the data base accept processing part 7-1, as described above, the processing mode select processing 18 checks the control code of the control field in the transfer data 27 (FIG. 4) transferred from the system on the client side 1. This is done to determine whether the data base access is to be effected through a synchronous processing or an asynchronous processing. For a reference request here, in order to effect a synchronous processing, the data base access request is registered to a data base access processing queue on the server system so as to sequentially execute the processing on the same data base. The serialize processing 19 checks to determine whether or not the request from the system on the client side 1 is received and the data base 12 is being updated. If the update processing of the data base 12 is taking place in response to the request from the system on the client side 1, the wait processing 20 is initiated to wait for the completion of the update processing. However, since the request here is the first request in a processing 8-1 of a request 11-1 for the data base processing part 5, the wait state is not required.

Consequently, the data base access processing part 21 is executed. When this processing is terminated, a response 11-2 is returned to the accept processing part 7-2. In the accept processing parts 7-1 and 7-2, since the request to the system on the server side 2 should be processing in a synchronous processing, in order to effect a synchronous processing, after the response 11-2 from the data base processing part 5 is received, a reference response (a) 10-2 is returned to the system on the client side 1.

In the client processing part 3, when it becomes necessary to update the data base 12 after an appropriate processing 6-2 is executed, an update request (b) 10-3 is sent to the system on the server side 2. Also in this processing, like in the case described above, the processing select processing 14 of the client processing part 3 is effected to determine whether the data base access request is related to a reference operation or an update operation. For the update request here, the update processing code set processing 15-1 of the server asynchronous processing request processing 15 sets "02" indicating an update data base processing request to the control code of the control field in the transfer data 27 (FIG. 4). Then, the send request processing 15-2 on the client side passes the control to the accept processing part 4 in the system on the server side so as to execute the server accept processing 7-3.

In the server accept processing 7-3 on the server side, as described above, the processing mode select processing 18 is achieved. For the asynchronous request, the response report processing 23 is first executed so as to return the update response (a) 14-b to the client processing part 3. As a result, although the data base access processing 21 in the system on the server side 2 has not been completed, the client processing part 3 assumes that the processing has been completed so as to continue the processing of the system on the client side 1 while the data base access is taking place in the system on the server side 2. In this regard, the processing 8-2 in the data base processing part 5 and the processing 6-3 in the client processing part 3 are parallelly or concurrently accomplished. In the processing 8-2 of the data base processing part 5 in the system on the server side 2, if the serialize processing 24 determines that the preceding update processing has not yet been completed, the next data base access processing is retained until the completion report of the preceding data base access processing is received. Hence, the wait processing 25 is initiated to wait for the completion of the preceding update processing. In this case, however, the preceding processing 8-1 has already been terminated. The data base access processing 26 is executed without necessitating the wait state.

When the processing 6-3 of the client processing part 3 is concurrently executed during an execution of the data base access processing 21 in the data base processing 8-2 and hence a request of an update request (c) 10-5 occurs, the processing select processing 14 of the client processing part 3 is executed. Since the data base access request is found to be related to an update operation as a result of the execution of the processing select processing 14, the server asynchronous processing request processing 15 is initiated so as to send the update request (c) 10-5 as an asynchronous processing request to the system on the server side 2. This causes the processing 7-4 to be executed in the accept processing part 4.

In the processing 7-4 of the accept processing part 4, since the update request (c) 10-5 is an asynchronous processing request as a result of the execution of the processing mode select processing 18, the response report processing 23 is executed to return the update response (c) 10-6 to the client processing part 3. The processing 6-3 of the client processing part 3 is concurrently executed with respect to the processing in the system on the server side 2; however, when it attempts to execute the processing 8-3 of the data base processing part 5 in the system on the server side 2, since the preceding processing 8-2 has not been yet completed, the serialize processing 24 passes the control to the wait processing 25 to initiate a wait processing 9-1.

Furthermore, when a reference request (d) 10-7 occurs in the processing 6-4 of the client processing part 3, since the data base access request is related to a reference operation as a result of the execution of the processing select processing 14 of the client processing part 3, the server synchronous processing request processing 16 is executed to send the reference request (d) 10-7 as a synchronous processing request to the system on the server side 2. In the processing 7-5 of the accept processing part in the system on the server side 2, since the processing mode select processing 18 determines that the request is related to a synchronous processing, the data base access request is registered to the data base access processing queue so as to sequentially execute the processing on the same data base. Then, the serialize processing 19 is effected.

In the serialize processing 19, it is determined whether a wait state is required to wait for the completion of the previous data base processing. Since the preceding processing 8-3 has not been finished yet, a wait processing 9-2 is initiated. When the processing 8-3 is completed, the processing 8-4 is fetched from the data base access processing queue so as to be executed in the data base access processing 21. When the processing is completed, the response report processing 22 is enabled to return a reference response (d) 10-8 via the processing 7-6 to the client processing part 3.

In the processing 6-5 of the client processing part 3, if another data base access request occurs, the processing like that described above is repetitiously executed until the end judge processing 17 detects the completion.

Then, the end of the transaction is declared in a 2-phase commitment system. In the 2-phase commitment system, when the end judge processing 17 detects the end of all the processing, in order to synchronize a plurality of transaction processings, a prepare-to commit instruction is issued for each transaction when a response to the data base access request is received. Furthermore, when the prepare-to commit processing is completed for all transactions, a commit processing is effected for all transactions. A prepare-to request f 10-11 as a commitment for confirmation is sent to the system on the server side 2 such that the data base processing part 5 transmits a commit request 11-9 via the processing 7-8. Under this condition, in the case where (1) an update request e 10-9 from the system of the client side 1 has already been received by the system on the server side 2, (2) a data base processing request 11-7 has already been issued via the processing 7-7 to the data base processing part 5 after the an update response e 10-10 is passed, and (3) the data base processing 8-5 is being executed; a ready-to commit response at a prepare-to commit response 11-9 is returned via the processing 7-9 to the client processing part 3 after the processing 8-5 is completed. In the case where a plurality of servers are provided, if a ready-to commit response is returned from each of the servers, a commit request h 10-13 is then sent to each server. If any data base processing fails, a corresponding server station returns to the client side a refuse response but not a ready-to commit response. When the refuse response is returned for any one of a plurality of transactions from the server station, a rollback request is issued into each server station. In such a manner, a synchronous processing is performed between server stations to ensure consistency of data base accessing. As a result, the commit processing is effected via the processing 7-10 by the data base processing 8-6 and a commit response 11-11 is returned via the processing 7-11 to the system of the client side 1. This enables the processing in the system on the client side 1 to be ended (commit response 6-8). This leads to a confirmation of the completion of the all data base access processing 21 and hence finally enables to guarantee the synchronization.

According to the present embodiment, in a distributed data base system, while guaranteeing the consistency of the data base processing viewed from the system on the client side, the processing in the system on the client side and the processing in the system on the server side can be effected in a concurrent fashion. This leads to minimization of execution time in the system on the client side. Furthermore, in the system on the server side, the data base access request is accepted in a concurrent fashion. This leads to increased CPU utilization rate of the system on the server side.

The embodiment has been described as an example and hence the present invention is not restricted by the embodiment.

As described above, according to the present invention, in a distributed data base system including a computer system having a data base and a plurality of computer systems effecting an update or a reference to the data base, a system on a client side requesting a data base access issues a request for a synchronous processing to a system on a server side if the data base access is related to a reference operation; whereas an asynchronous processing is requested if the data base access is associated with an update operation. On receiving such a request of a synchronous processing, the system on the server side returns a response to the system on the client side after the requested data base processing is completed. If an asynchronous processing is requested, the response is returned to the system on the client side without waiting for the completion of the requested data base processing. Consequently, paying attention to the fact that among the data base access requests from the system of the client side, those related to an update operation can be processed in the system on the server side in an asynchronous fashion with respect to the processing in the system on the client side. Thus the execution time in the system on the client side is reduced.

While the present invention has been described with reference to the particular illustrative embodiments, it is not restricted by those embodiments, but only by the appended claims. It is to be appreciated that those skilled in the art can change and modify the embodiments without departing from the scope and spirit of the invention.

We claim:

1. A distributed data base system including a server side system having a data base and a client side system in communication with the server side system for a client requesting access to the data base, comprising:
    a client processing means for analyzing the client requesting of access including means for distinguishably coding a reference access request and an update access request, respectively, and for sending coded access requests and receiving responses to and from the server side system;
    a server accept processing means for receiving and distinguishing reference access requests and update access requests and including means for responding to the client side system; and,
    a server data base processing means for processing a reference access and an update access to the data base, and wherein the server accept processing means includes response means for responding to the client side system upon receipt of the update access request prior to completion by the server data base processing means of the update access to the data base, for overlapping processing by the client processing means and the server data base processing means.

2. The system as defined in claim 1 further including means for wait processing in the server data base processing means upon receipt of an other access request by the client until completion of processing of the update access request.

3. The system as defined in claim 2 including means for end judge processing of wait processing by the data base processing means.

4. A distributed data base access request processing system having a client side system and a server side system having parallel processing by the client side system and the server side system comprising:
    means for selectively coding a reference access request and an update access request by the client side system to the server side system;
    means for processing the update access request in the server side system; and,
    means for accepting and decoding the reference access request and the update access request by the server side system and including means for responding to the client side system before completion of processing of the update access request wherein the client side system may process a next request parallelly with the processing of the update access request by the server side system.

5. The system as defined in claim 4 wherein the reference access request by the client side system comprises a synchronous processing request and the update access request comprises an asynchronous processing request.

6. The system defined in claim 4 further comprising:
determination means for determining whether update processing of a data base is being executed;
execution means for executing data base access processing if the update processing is complete; and,
initiation means for initiating a wait processing to wait for completion of the update processing if the update processing is not complete.

7. A method for parallel processing by a client side system and a server side system in a distributed data base access request system comprising:

selectively coding for distinguishment requests comprising an update access request and a reference access request by the client side system to the server side system;
processing the requests in the server side system;
first responding by the server side system to the client side system after completion of the processing of the reference access request;
second responding by the server side system to the client side system before completion of processing of the update access request wherein the client side system may process and code a next request during the processing of the update access request by the server side system.

8. The method as defined in claim 7 further including waiting in the server side system for completion of processing of the update access request before processing of the next request.

* * * * *